N. W. STORER.
SYSTEM OF CONTROL.
APPLICATION FILED MAY 16, 1916.

1,403,355.

Patented Jan. 10, 1922.
2 SHEETS—SHEET 1.

Acceleration.

WITNESSES:
Albert Schiefelbein
H. C. Lowe

INVENTOR
Norman W. Storer.
BY
Wesley G. Carr
ATTORNEY

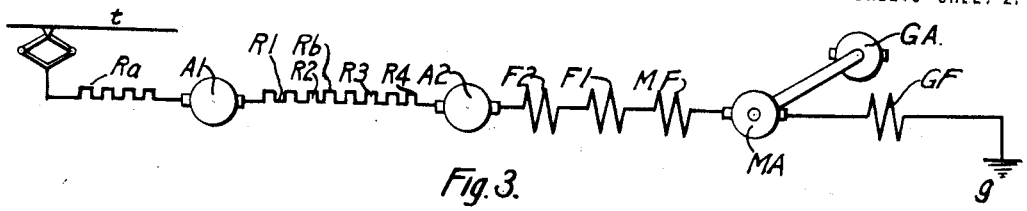
Fig. 3.
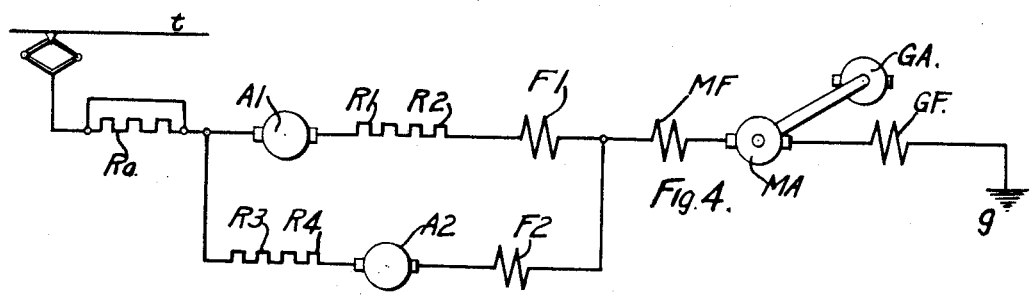
Fig. 4.
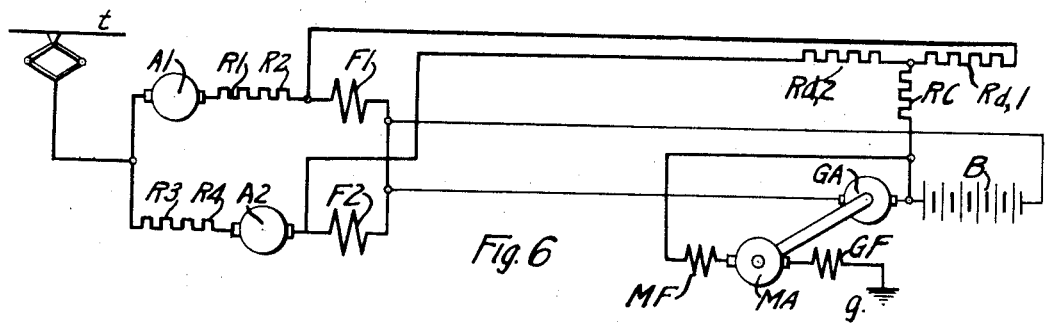
Fig. 6.
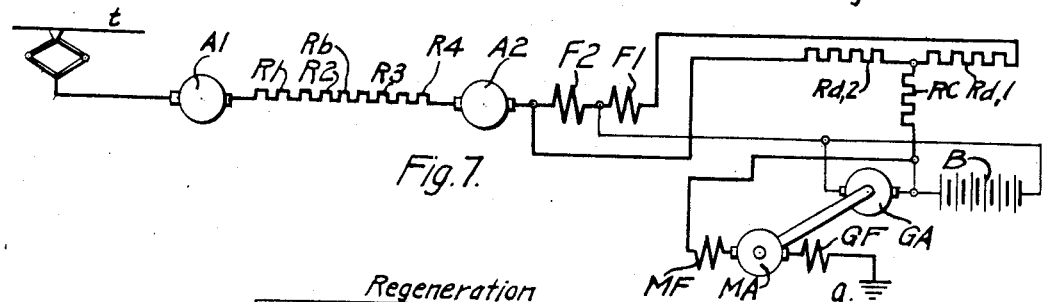
Fig. 7.
Fig. 5.

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,403,355.  Specification of Letters Patent.  Patented Jan. 10, 1922.

Application filed May 16, 1916. Serial No. 97,873.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control for electric vehicles and particularly to systems that are adapted to energize the auxiliary motors and lights of the vehicles by energy received from main high-voltage supply circuits.

One object of my invention is to provide a low-voltage circuit for the auxiliary motors and lights of a vehicle, that may be supplied with energy from the high-voltage supply circuit which supplies energy to the propelling motors of the vehicle.

Another object of my invention is to provide a system of the above indicated character that shall maintain a low fixed voltage for the auxiliary motors and lights of the vehicle, independent of the changes in the high-voltage supply circuit.

A further object of my invention is to provide a system of the above indicated character with a storage battery, for supplying energy to the vehicle auxiliary motors, that is charged by means of a motor-generator set which is operated by current from the main high-voltage supply circuit.

More specifically, my invention consists in a control system for a locomotive the propelling motors of which are supplied with energy from a high-voltage supply circuit. In series with the propelling motors, which may be operated as generators when decelerating or when operating on a down-grade, is provided a motor-generator set to charge the battery that supplies the auxiliary motors and lights of the locomotive with energy. The field winding of the generator and the field winding of the motor of the motor-generator set are connected in series through the propelling motors to the high-voltage supply circuit, whereby the battery-charging voltage may be maintained constant, irrespective of the variations in the voltage of the supply circuit. In case the main motors are operated as generators, the battery serves as a source of energy for energizing the motor field windings.

In the accompanying drawings illustrating my invention, Fig. 1 is a diagrammatic view of a high-voltage control system constructed in accordance with my invention;

Figs. 3 and 4 are diagrammatic views illustrating the circuits formed through the motors in Fig. 1, during acceleration;

Fig. 5 is a sequence chart indicating the sequence of operation of the switches shown in Fig. 1, during regeneration; and Figs. 6 and 7 are diagrammatic views illustrating the circuits formed through the motors shown in Fig. 1, during regeneration. Like parts are designated by like reference characters in the various figures of the drawings.

Figure 1:
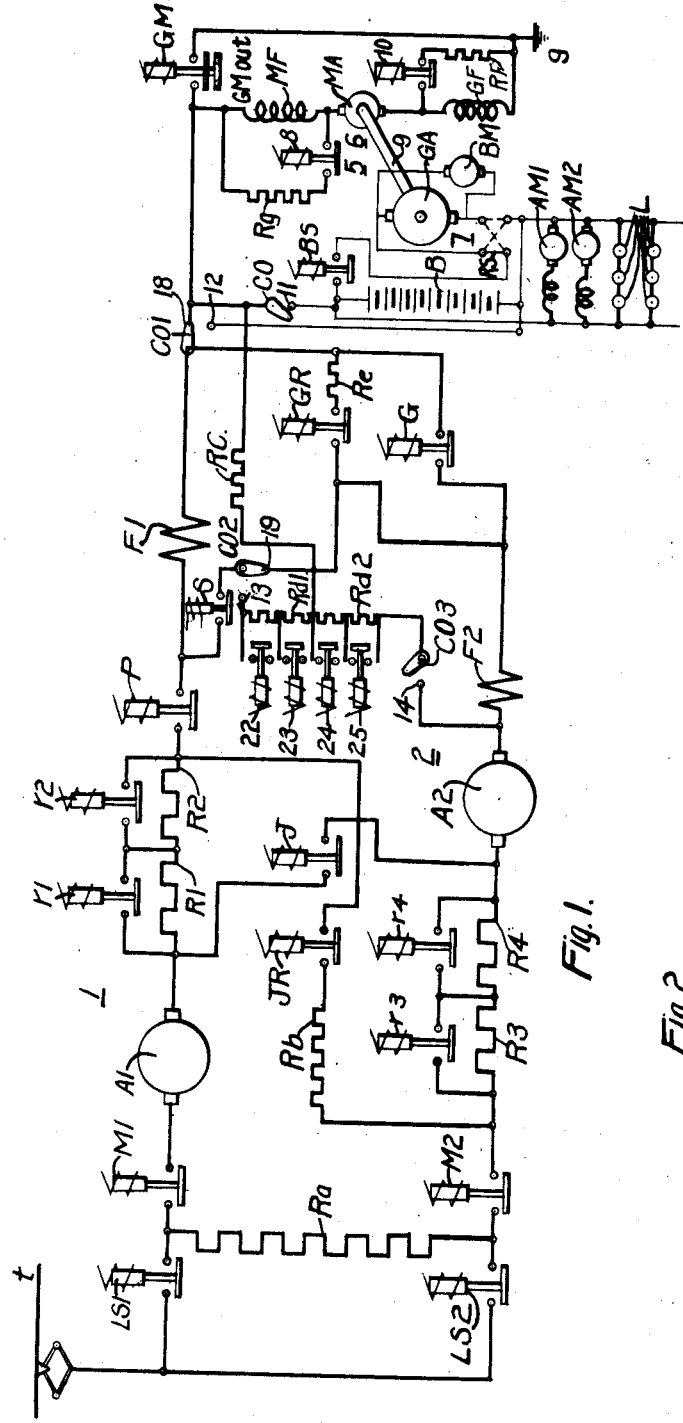

My invention, as set forth above, consists in providing means for obtaining a low-voltage current to operate the auxiliary motors and lights of a locomotive that is supplied with energy from a high-voltage supply circuit. My invention is not necessarily limited to the single form shown in the drawings and may be employed for a great variety of application. No controller diagrams have been illustrated as it is to be understood that any approved means may serve for operating the switches of the system according to the sequence charts.

Referring to Fig. 1 of the drawing, motors 1 and 2 having armatures A1 and A2 and field-magnet windings F1 and F2, respectively, are adapted to be connected in series and in parallel operation across a supply circuit comprising the conductors $t$ and $g$, by means of switches LS1, LS2, M1, M2, J, JR, P, S, G and GR. Accelerating resistors R$a$ R1 to R4, inclusive, are included in circuit with the motors 1 and 2, and are adapted to be short-circuited by means of the line switch LS1 and switches $r1$ to $r4$, inclusive, in order to accelerate the motors whether the same be connected in series or in parallel relation across the supply conductors $t$ and $g$. Accelerating resistor R$b$ may be shunted by a transitional switch J.

A resistor R$e$ is provided for preventing the short circuiting of the field windings F1 and F2 by the switches S and G when changing from series to parallel operation of the motors. Reversing switches have not been shown, as their operation is well understood.

A motor-generator set 5, comprising a motor 6, having an armature MA and a field-magnet winding MF and a generator 7, having an armature GA and a field winding GF is operated by the current flowing through the motors 1 and 2. The motor field-magnet winding MF, the motor armature MA and the generator field-magnet winding GF are inserted in the motor circuit between the motors 1 and 2 and the ground conductor $g$.

A resistor $Rg$ is adapted to be connected across the motor field windings MF by means of a switch 8, in order to vary the excitation of the motor field windings MF. A switch GM is provided for excluding the motor-generator set from the circuit of the propelling motors when desired.

The generator armature GA, which is mounted on a shaft 9 with the motor armature MA, is adapted to charge a storage battery B when connected thereto by means of a battery switch BS.

A resistor $Rf$ is adapted to be connected across the generator field-magnet winding GF by means of a switch 10, in order to vary the excitation of the generator field-magnet winding GF.

A reversing switch RS is provided for reversing the terminals of the armature GA relative to battery B when the motors 1 and 2 are operating as generators. The position of the reversing switch RS must be changed during regeneration by reason of the reversal of the current which operates the motor-generator set 5. A number of auxiliary motors, respectively designated AM1, AM2 and BM, and lights L for the locomotive are also shown connected to the storage battery B.

The blower motor BM is connected to the generator-armature terminals, in order to prevent an excessive speed of the motor-generator set in case the same be released of the main load thereon, by reason of the switch BS being opened.

Switches CO, Co1 and CO2 are provided for changing the circuit connections of the system to allow the motors to be operated as generators to regenerate energy when the locomotive is being decelerated, or when it is being operated on a down grade. When the motors are operated to regenerate energy, the switch CO is moved to engage a contact terminal 11, the switch CO1 is moved to engage a contact terminal 12 and the switch CO2 is moved to engage a contact terminal 13. When the motors 1 and 2 are operating as propelling motors, the switch CO is open and the switches CO1 and CO2 respectively engage the contact terminals 18 and 19.

A resistor $Rc$ is inserted in the circuit between the battery B and the field-magnet windings F1 and F2. During regeneration, the field windings F1 and F2 are respectively provided with resistors $Rd1$ and $Rd2$ in circuit therewith, which are short circuited by means of switches 22 to 25, inclusive.

The operation of my control system during acceleration is begun (see position 1) by closing the switches LS2, M1, JR, S and BS to establish a circuit which may be traced from the trolley conductor $t$ through line switch LS2, resistor Ra, switch M1, armature A1, resistors R1 and R2, switch JR, resistors Rb, R3 and R4, armature A2, field-magnet winding F2, switch CO2 and S, field-magnet winding F1, switch Co1, field-magnet winding Mf, armature MA and a field-magnet winding GF to the ground conductor $g$.

The motors 1 and 2 are thus connected in series with the resistors Ra, Rb, and R1 to R4, inclusive, field-magnet windings MF and GF and the armature MA, as illustrated in Fig. 3 of the drawings.

The switch BS being operated when the motors 1 and 2 are energized, the current from the motors, in passing through the armatures and the field winding of the motor 6 and the field winding of the generator 7, energize the motor-generator set 5 and charge the battery B from the generator 7.

In case it is desired to change the voltage generated for charging the battery, the motor field-magnet winding MF may be shunted by a circuit comprising a resistor Rg and switch 8, or the generator field-magnet winding GF may be shunted by a circuit comprising a resistor Rf and switch 10.

The magnetic circuits of the motor 6 and the generator 7, of the motor-generator set 5 may be designed to smooth out the peaks of current in the circuit of the propelling motors 1 and 2. If the magnetic circuit of the motor 6 of the motor-generator set 5 were totally saturated and the magnetic circuit of the generator 7 were entirely unsaturated, the circuit current flowing through the generator armature GA would be practically a constant quantity, regardless of the propelling-motor current.

The torque of the generator 7 of the motor-generator set must balance that of the motor 6 in order to maintain equilibrium. Therefore, if the magnetic field of the motor 6 remains constant at all loads, the torque of the motor must vary directly as the current in the circuit comprising the propelling motors 1 and 2 varies. Also, the flux of the generator 7 varies directly as the current flowing through its field winding GF, which is in the main motor circuit, the armature current thereof must remain constant.

In position 2, the line switch LS1 is operated to exclude the resistor Ra from the motor circuit, and, in positions 3 and 4, the resistors R1 to R4, inclusive, are shunted from the motor circuit. In position 5, the switch J closes, thereby shunting the resistor R$b$.

Between position 5, which is the last series position of the motors, and position 6, which is the first parallel position of the motors, are three transition positions for changing the motors from series to parallel relation by the familiar shunting transition method.

In the first transitional position, accelerating contactors R1 to R4, inclusive, and JR are released. The switch J remains closed thereby providing a shunt circuit across the resistors R$b$ and R1 to R4, inclusive. In the second transitional position, switch M2, P and GR are closed. In the third transitional position, the switches J and S are opened.

In position 6, the switch G is closed and the switch GR is opened, whereupon the motors 1 and 2 are connected in parallel relation. The circuit through the motor 1 may be traced from the trolley $t$ through the switches LS1 and M1, armature A1, resistors R1 and R2, parallel-connected switch P, field-magnet winding F1, switch CO1, auxiliary motor field-magnet winding MF, auxiliary motor armature MA and generator field-magnet winding GF to Ground.

Figure 2:
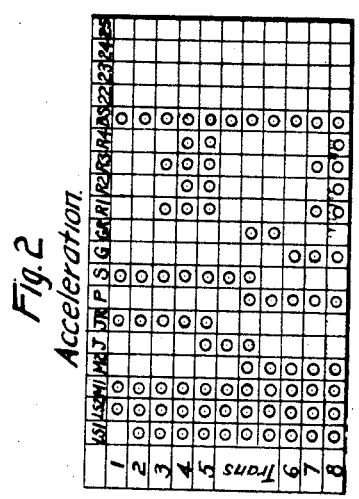
Fig. 2 is a sequence chart of a well known form for indicating the sequence of operation of the switches illustrated in Fig. 1, during acceleration.

The circuit through the motor 2 may be traced from the trolley through line switch LS2, switch M2, resistors R3 and R4, armature A2, field-magnet winding F2, switches G and CO1, auxiliary motor field-magnet winding MF, auxiliary motor armature MA and generator field-magnet winding GF to Ground. The motors 1 and 2 are further accelerated in positions 7 and 8 by shunting resistors R1 to R4, inclusive, by the closure of the corresponding switches R1 to R4, inclusive, in accordance with the sequence chart that is shown in Fig. 2 of the drawings. The motors 1 and 2 are thus connected in parallel relation in a circuit including the motor-generator set 5, as illustrated in Fig. 4 of the drawings.

In case the locomotive be operated on a down grade and it is desired to regenerate energy, the main switches illustrated in Fig. 1 of the drawings are operated in accordance with the sequence chart illustrated in Fig. 5. Before the main switches are operated, the switch CO is moved to engage the contact terminal 11, the switch CO1 is moved to engage the contact terminal 12 and to disengage the contact terminal 18, the switch CO2 is moved to engage the contact terminal 13 and to disengage the contact terminal 19 and the switch CO3 is moved to engage the contact terminal 14.

In the "off" position of the system illustrated in Fig. 1, when preparing for regeneration, the switches M1, M2, P, G and BS are closed to establish circuits through the motors 1 and 2 and to connect the field-magnet windings F1 and F2 to the battery B.

A circuit from the battery B through the field winding F1 may be traced from one terminal of the battery through the switch CO, resistor R$c$, resistor R$d$1, switches CO2 and S, field-magnet winding F1 and the switch CO1 to the other terminal of the battery B. A circuit comprising the field-magnet winding F2 may be traced from one terminal of the battery B through switch CO, resistors R$c$ and R$d$2, switch CO3, field-magnet winding F2 and switches G and CO1 to the other terminal of the battery B. By means of the above circuits, the field-magnet windings F1 and F2 are excited during regeneration by the battery B.

The switch RS1 having been closed in its reverse position to reverse the direction of current traversing the field-magnet windings F1 and F2, the line switches LS1 and LS2 are closed, thereby connecting the motors 1 and 2 in parallel relation, through the motor-generator set 5, to the supply conductors $t$ and $g$. The circuit through the armature of the motor 1 may be traced through the line switch LS1, switch M1, armature A1, resistors R1 and R2, switches P, S and CO2, resistors R$d$1 and R$c$, field-magnet winding MF, armature MA and field-magnet winding GF to Ground.

The circuit through the armature of the motor 2 may be traced from the trolley conductor $t$ through switches LS2 and M2, resistors R3 and R4, armature A2, switch CO3, resistors R$d$2 and R$c$, field-magnet winding MF, armature MA and auxiliary generator field-magnet winding GF to Ground. The energizing circuits of the field-magnet windings F1 and F2 are maintained as above set forth and the armatures of the motors 1 and 2 are connected in parallel relation across the supply conductors $t$ and $g$, as illustrated in Fig. 6 of the drawings.

In positions 2 and 3, the switches R1 to R4, inclusive, are successively operated in pairs to short-circuit the resistors R1 to R4, inclusive. In positions 4 and 5, the switches 22 to 25, inclusive, are successively operated in pairs, in accordance with the sequence chart that is shown in Fig. 5, to exclude portions of the resistors R$d$1 and R$d$2 from the circuit of the armatures of the motors 1 and 2 and from the energizing circuits of field-magnet windings F1 and F2.

Between position 5, which is the last parallel regenerative position, and position 6, which is the first series regenerative position, are three positions for effecting transition of the motors 1 and 2 from parallel to series relation by the well known shunting transition method. The switches R1 to R4, inclusive, and switches 22, 23, 26 and 27 are released, while the switch JR1 is closed and the switches M2 and P are opened.

In position 6, the switches LS1 and LS2, M1, JR, G, R1, R3 and BS are closed, thereby connecting the motors in series relation through the motor-generator set 5 to the supply conductors $t$ and $g$.

The circuit through the motors 1 and 2 may be traced from the trolley conductor $t$ through the switches LS1 and M1, armature A1, resistors R1 and R2, switch JR, resistor R$b$, resistors R3 and R4, armature A2, switch CQ3, resistors R$d$2 and R$c$, motor field-magnet winding MF, motor armature MA and field-magnet winding GF to the ground conductor $g$. The motors 1 and 2 are thus connected in series relation across the supply conductors $t$ and $g$, as illustrated in Fig. 7 of the drawings.

In positions 7 and 8, the resistors R2 and R4 and R$b$1 are shunted upon the closure of the switches R2, R4 and J.

Whether the motors 1 and 2 illustrated in Fig. 1 operate as propelling motors or as generators, the motor-generator set 5 is energized by the current flowing through the motors 1 and 2 to charge the storage battery B and to supply energy for the auxiliary motors and lights of the locomotive. In case the motors in Fig. 1 be operated as generators, the motor-generator 5 and the battery B serve as a source of energy for energizing the field windings F1 and F2.

Various modifications in the specific circuit connections and arrangement of parts herein set forth may be made within the spirit and scope of my invention, and I desire, therefore, that only such limitations shall be imposed as are indicated in the appended claims.

I claim as my invention:

1. In a system of vehicle control, the combination with a supply circuit and a vehicle-propelling motor connected thereto, of a translating device, a storage battery for supplying energy to the translating device, and auxiliary means operated by the current flowing through the propelling motor for charging the battery.

2. In a system of vehicle control, the combination with a supply circuit, and a vehicle-propelling motor connected thereto, of a translating device, a storage battery for energizing the translating device, and means comprising a motor-generator set operated by the current flowing through the propelling motor for charging the battery.

3. In a system of vehicle control, the combination with a supply circuit, a vehicle-propelling motor, a motor-generator set and means for connecting the motor of said set through the propelling motor to the supply circuit, of a storage battery and an auxiliary motor connected in parallel to the generator of said set.

4. In a system of vehicle control, the combination with a high voltage supply circuit, a dynamo-electric machine connected thereto on the vehicle and a motor-generator set connected through said dynamo-electric machine to the supply circuit, of a storage battery adapted to be charged by said motor-generator set.

5. In a system of control, the combination with a supply circuit, a dynamo-electric machine, a storage battery and a motor-generator set for charging said battery, of means for connecting the motor of said motor-generator set through said dynamo-electric machine to the supply circuit and means for varying the connection between the motor-generator set and the supply circuit, whereby the generated voltage may be maintained constant in case the supply circuit voltage varies.

6. In a system of vehicle control, the combination with a supply circuit, a dynamo-electric machine on the vehicle, a motor-generator set and a storage battery adapted to be charged by said motor-generator set, of means for connecting the motor of the motor-generator set through the dynamo-electric machine to the supply circuit, whereby the battery may be charged at a fixed voltage.

7. In a system of control for an electric vehicle, the combination with a supply circuit, a vehicle-propelling motor adapted to be connected to said supply circuit and a motor-generator set having the motor thereof connected through said propelling motor to the supply circuit, of a storage battery charged by the generator of said motor-generator set.

8. In a system of control for an electric vehicle, the combination with a supply circuit, a plurality of propelling motors and means for connecting said motors in various circuit relations to the supply circuit, of a motor-generator set comprising a motor having an armature and a field winding and a generator having an armature and a field winding, the armature and field winding of said motor and the field winding of said generator being connected in series-circuit relation through said propelling motors to the supply circuit.

9. In a system of control for an electric vehicle, the combination with a supply circuit, a plurality of propelling motors and means for connecting said motors in various circuit relations to the supply circuit, of a storage battery and a motor-generator set comprising a motor having an armature and a field winding and a generator having an armature and a field winding, the armature and field winding of said motor and the field winding of said generator being connected in series-circuit relation through said propelling motors to the supply circuit and the armature of the generator being connected to the storage battery for charging the same.

10. In a system of control for an electric vehicle, the combination with a supply circuit, a plurality of propelling motors, means for connecting said motors in various circuit relations to the supply circuit, a plurality of auxiliary motors for the vehicle, and a storage battery for supplying energy to said auxiliary motors, of a motor-generator set for charging said batter comprising a motor having an armature and a field-magnet winding and a generator having an armature and a field magnet winding, the armature and field winding of the motor of said set being connected through said propelling motors to the supply circuit.

11. In a system of control, the combination with a dynamo-electric machine having an armature and a field-magnet winding, of means for connecting said machine to operate as a motor and as a generator, a storage battery for energizing the field winding under predetermined conditions, and dynamo-electric means for charging the battery by the energy generated by the dynamo-electric machine.

12. In a system of control, the combination with a plurality of dynamo-electric machines having armatures and field-magnet windings and means for operating said machines as generators and as motors, of a storage battery, means for charging the battery with the current generated by said machines or by the current passing therethrough according to whether the same be operated as generators or as motors, and means for energizing the field windings from the storage battery when the machines are operated as generators.

13. In a system of control, a supply circuit, a plurality of dynamo-electric machines and means for connecting said machines to the supply circuit to be operated as motors and as generators, of a storage battery and means operated by the current flowing through said dynamo-electric machines when serving as motors or as generators for charging said battery.

14. In a system of control, the combination with a supply circuit, a plurality of dynamo-electric machines having armatures and field windings, and means for connecting said machines to the supply circuit to be operated as motors or as generators, of a storage battery, means operated by the current flowing through said dynamo-electric machines when serving as motors for charging said battery and means for energizing the field windings from the storage battery and for charging the battery by the current flowing through the dynamo-electric machines when the dynamo-electric machines serve as generators.

15. In a system of control, the combination with a supply circuit, a plurality of dynamo-electric machines having armatures and field windings, means to connect said machines to the supply circuit and to operate the same as motors and as generators, a motor-generator set comprising a motor and a generator and means for connecting the motor of said set through the dynamo-electric machines to the supply circuit when the latter are operated as motors, of a storage battery and means for charging the battery by said motor-generator set when the dynamo-electric machines are operated as motors and as generators and means for maintaining the battery-charging voltage constant.

16. In a system of control, the combination with a supply circuit, a plurality of dynamo-electric machines and means to connect said machines to the supply circuit to be operated as motors and as generators, of a storage battery, a motor-generator set, means for connecting said set through the dynamo-electric machines to the supply circuit and means for charging the battery by the motor-generator set when the dynamo-electric machines are operated as motors or as generators.

17. In a system of control, the combination with a supply circuit, a plurality of dynamo-electric machines, means for connecting said dynamo-electric machines to the supply circuit to be operated as motors during normal operation and as generators during regeneration, a motor-generator set and means for connecting the motor of said set through said dynamo-electric machines to the supply circuit when the latter are operated as motors, of a plurality of auxiliary motors, a storage battery energized by said motor-generator set and adapted to supply energy to the auxiliary motors and to said field windings during regeneration.

18. In a system of control, the combination with a supply circuit, a plurality of dynamo-electric machines, means for joining said machines to the supply circuit to be operated as generators and as motors, a motor-generator set and means for connecting the motor of said set through the dynamo-electric machines to the supply circuit when said machines are operated as motors, of a storage battery charged by the generator of the motor-generator set when the latter is connected to the supply circuit, and means for energizing the field winding of the dynamo-electric machines by the storage battery when the machines are operated as generators.

19. In a system of control, the combination with a supply circuit, a plurality of dynamo-electric machines, means for operating said machines as motors through successive steps and means for operating said machines as generators through a number of steps, of a storage battery, a motor generator set and means for charging the battery from the motor-generator set energized by the current flowing through the dynamo-electric machines when the latter are operating as motors and as generators.

20. In a system of vehicle control, the combination with a supply circuit and a dynamo-electric machine connected thereto on the vehicle, of an auxiliary translating device, an energy-accumulating device for supplying energy to said translating device, and means operated by the current flowing through said machine and mechanically independent thereof for charging said energy-accumulating device.

21. In a system of vehicle control, the combination with a supply circuit and a dynamo-electric machine connected thereto on the vehicle, of an auxiliary translating device, an energy-accumulating device for supplying energy to said translating device, and means comprising a motor-generator operated by the current flowing through said machine for charging said energy-accumulating device.

22. In a system of vehicle control, the combination with a supply circuit and a main dynamo-electric machine connected thereto on the vehicle, of a storage battery, and a plurality of auxiliary mechanically-connected armature windings respectively energized by the current flowing through said main machine and connected to said battery.

In testimony whereof, I have hereunto subscribed my name this 29th day of April, 1916.

NORMAN W. STORER.